No. 839,292. PATENTED DEC. 25, 1906.
H. S. HUMPHREY.
WATER HEATER.
APPLICATION FILED JULY 22, 1904. RENEWED AUG. 9, 1906.
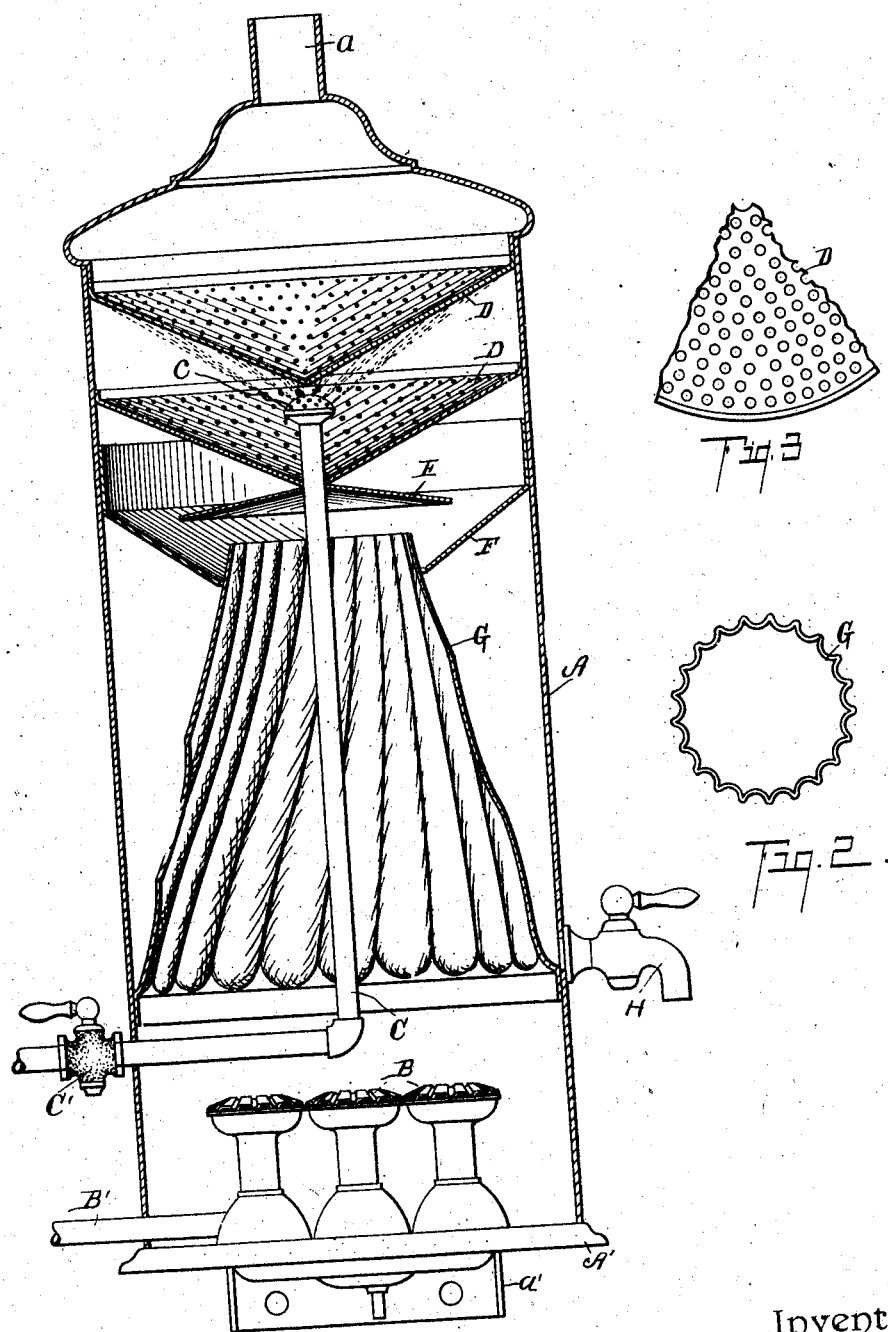
Witnesses:
Ethel A. Teller
Otis A. Earl
Inventor,
Herbert S. Humphrey
By _____
Att'y.

UNITED STATES PATENT OFFICE.

HERBERT S. HUMPHREY, OF KALAMAZOO, MICHIGAN, ASSIGNOR TO HUMPHREY COMPANY, OF KALAMAZOO, MICHIGAN.

WATER-HEATER.

No. 839,292. Specification of Letters Patent. Patented Dec. 25, 1906.

Application filed July 22, 1904. Renewed August 9, 1906. Serial No. 329,855.

*To all whom it may concern:*

Be it known that I, HERBERT S. HUMPHREY, a citizen of the United States, residing at the city of Kalamazoo, county of Kalamazoo, State of Michigan, have invented certain new and useful Improvements in Water-Heaters, of which the following is a specification.

This invention relates to improvements in water-heaters.

It relates particularly to the class of water-heaters known as "instantaneous," such as is shown and described in Letters Patent of Alfred H. Humphrey, No. 704,043, dated July 8, 1902, and it is an improvement thereon and in some respects a modification thereof.

The objects of this invention are, first, to provide an improved water-heater which is simple and compact in structure, of large capacity, and economical to use; second, to provide an improved water-heater to which the water is so delivered and distributed as to be brought into such contact with the heated air or gases arising from the burners as to quickly absorb the heat therefrom.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a detail vertical sectional view of my improved water-heater, the burners and the gas and water pipes being shown in full lines. Fig. 2 is a plan view of the upper end of the tube G. Fig. 3 is an enlarged detail view of the perforated baffle-plates.

In the drawings similar letters of reference refer to similar parts throughout the several views.

Referring to the drawings, I provide an outer casing A, which is preferably cylindrical in form. This casing rests upon a suitable base, as A', which is preferably provided with a bracket at one side, as a', by which it may be secured to the wall or to any other suitable support. It may of course be arranged to rest upon its own base. The casing A is provided with a flue a at the top for the escape of the gases of combustion. In the lower part of the casing A suitable burners, as B, are arranged. These burners are connected by the pipe B' to a suitable gas-supply.

It is evident that other means might be employed for delivering heated air or gases to the base of the casing, although I prefer to arrange the gas-burners therein as shown in the drawings.

Arranged above the burners B is an open-ended conical tube, as G. This tube is preferably spirally corrugated, as is clearly illustrated in the drawings. The base of the tube G is adapted to fit the walls of the casing A, and is secured thereto, thereby forming a water-receptacle for the heated water between it and the walls of the casing. A delivery-faucet, as H, is provided for this receptacle.

An inverted conical or funnel shaped plate F, having a central opening through which the upper end of the tube G is arranged, is provided. The periphery of this plate fits the walls of the casing and is secured thereto.

A water-delivery pipe C is arranged centrally in the casing through the tube G. This pipe is provided with a spraying-head c at its upper end. The water-delivery pipe C is provided with a suitable stop cock or valve C'.

Above the upper open end of the tube G is a deflector-plate E. This deflector-plate E prevents the water from above entering the tube G and also spreads out the heated air or gases delivered from the upper end of the tube G. The plate E is preferably supported on the water-delivery pipe C. Above this deflector-plate E are perforated baffle-plates D, one of which is arranged above the spraying-head c and the other below it. These perforated baffle-plates are conical in form and are arranged in an inverted position. They extend completely across the casing A, forming partitions therein, as clearly appears from the drawings.

In operation the gas and water are preferably turned on simultaneously. The water is delivered by the sprinkler-head c to the under side of the upper baffle-plate and to the upper side of the lower baffle-plate. The sprinkler-head is preferably arranged so that the greater portion of the water is delivered to the under side of the upper baffle-plate and flows or drops therefrom to the lower baffle-plate. These baffle-plates are conical in form, so that the tendency of the water is to flow down the same, and in doing so seal, or practically seal, the perforations therein. The heated air and gases of combustion pass up through the cone G and impinge against the under side of the deflector-plate E, by which they are spread, so that they are quite evenly delivered to the under side of the lower baffle-plate, through the perforations of which they pass, breaking through the films of water over the perforations, coming thereby in close contact therewith, so that the water readily takes up the heat therefrom. The heated air and gases pass on through the space between the baffle-plates in which the water is being delivered to the plates in a spray by the sprinkler-head and through the perforations in the upper baffle-plate and are carried off by the flue $a$. The water and the heated air or gas are thus brought so thoroughly into contact that the water practically absorbs all the heat thereof. The water passing down to the deflector plate E, which has become heated, absorbs more heat. The water is delivered by the deflector-plate E to the plate F, by which it is delivered onto the tube G. This tube or cone G is also heated, so that by the time the water reaches the base of the tube it is thoroughly heated.

The spiral corrugations of the tube G somewhat retard the flow of water down the same and also retard the upward passage of the heated air and gases, so that it adds to the effectiveness of the heater, although satisfactory results may be secured if these corrugations are omitted.

By thus arranging the parts I am enabled to utilize a maximum of heat units generated by the burner. The heater is very compact and simple and economical to produce and is of very large capacity. The parts are so arranged that they are very durable, and the structure is not liable to get out of repair or become clogged by use.

I have illustrated my improved water-heater in the form preferred by me on account of its simplicity and durability and economy in use, although I am aware that the structural details may be varied without departing from my invention.

Having thus described my invention, what I claim as new, and desire to secure by Letters Patent, is—

1. In a water-heater, the combination of a casing; an open-ended spirally-corrugated conical tube arranged in said casing, the base of said tube closely fitting the walls of said casing and secured thereto; an inverted conical plate having a central opening therein, through which the upper end of said conical tube is arranged, closely fitting and secured to the walls of said casing; a deflector-plate supported above the open upper end of said conical tube; a water-spraying head; perforated conical baffle-plates arranged in an inverted position, one above and the other below said spraying-head, forming partitions in said casing; and means for introducing heated gases to the base of said casing, for the purpose specified.

2. In a water-heater, the combination of a casing; an open-ended conical tube arranged in said casing, the base of said tube closely fitting the walls of said casing and secured thereto; an inverted conical plate having a central opening therein, through which the upper end of said central tube is arranged, closely fitting and secured to the walls of said casing; a deflector-plate supported above the open upper end of said conical tube; a water-spraying head; perforated conical baffle-plates arranged in an inverted position, one above and the other below said spraying-head, forming partitions in said casing; and means for introducing heated gases to the base of said casing, for the purpose specified.

3. In a water-heater, the combination of a casing; an open-ended spirally-corrugated conical tube arranged in said casing, the base of said tube closely fitting the walls of said casing and secured thereto; a deflector-plate supported above the open upper end of said conical tube; a water-spraying head; perforated conical baffle-plates arranged in an inverted position, one above and the other below said spraying-head, forming partitions in said casings; and means for introducing heated gases to the base of said casing, for the purpose specified.

4. In a water-heater, the combination of a casing; an open-ended conical tube arranged in said casing, the base of said tube closely fitting the walls of said casing and secured thereto; a deflector-plate supported above the open upper end of said conical tube; a water-spraying head; perforated conical baffle-plates arranged in an inverted position, one above and the other below said spraying-head, forming partitions in said casing; and means for introducing heated gases to the base of said casing, for the purpose specified.

5. In a water-heater, the combination of a casing; perforated conical baffle-plates arranged in said casing in an inverted position forming complete partitions therein, adapted to finely divide the water fed thereto so as to seal or partially seal the said perforations therein; a water-spraying device arranged between said baffle-plates; and means for introducing heated gases into said casing below said baffle-plates, whereby said gases are caused to pass upwardly through the perforations in said baffle-plates, for the purpose specified.

6. In a water-heater, the combination of a casing; a perforated conical baffle-plate arranged in said casing in an inverted position, forming a complete partition therein; a water-spraying device arranged below said plate adapted to deliver the water to the under side thereof so as to seal the said perforations therein; and means for introducing heated gases into said casing below said baffle-plate, for the purpose specified.

7. In a water-heater, the combination of a casing; a perforated baffle-plate arranged in said casing in an inverted position, forming a complete partition therein; a water-spraying device arranged below said plate adapted to deliver the water to the under side thereof so as to seal, or partially seal, the said perforations therein; and means for introducing heated gases into said casing below said baffle-plate whereby said gases are caused to pass upwardly through the perforations in said baffle-plate, for the purpose specified.

8. In a water-heater, the combination of a casing; an inverted perforated conical baffle-plate arranged in said casing forming a complete partition therein; a water-spraying device arranged beneath the apex of the said conical baffle-plate adapted to deliver the water across the same so as to seal or partially seal the said perforations therein; and means for introducing heated gases into said casing below said baffle-plate, whereby said gases are caused to pass upwardly through the perforations in said baffle-plate, for the purpose specified.

In witness whereof I have hereunto set my hand in the presence of two witnesses.

HERBERT S. HUMPHREY.

Witnesses:
ETHEL A. TELLER,
OTIS A. EARL.